United States Patent
Lin et al.

(10) Patent No.: US 6,517,044 B1
(45) Date of Patent: Feb. 11, 2003

(54) SOFT-LANDING PLUNGER FOR USE IN A CONTROL VALVE

(75) Inventors: Yingjie Lin, El Paso, TX (US); Lorenzo Guadalupe Rodriguez, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/955,709

(22) Filed: Sep. 19, 2001

(51) Int. Cl.⁷ ............................................. F16K 31/02
(52) U.S. Cl. ..................................... 251/64; 251/129.19
(58) Field of Search .............................. 251/64, 129.17, 251/157, 176, 77, 129.19, 129.15

(56) References Cited

U.S. PATENT DOCUMENTS

| | | | |
|---|---|---|---|
| 4,250,924 A | * 2/1981 | Sakakibara et al. | ...... 251/129.2 |
| 5,145,152 A | * 9/1992 | Komuro et al. | ............ 251/176 |
| 5,374,029 A | * 12/1994 | Bailey | .................. 251/129.17 |
| 5,967,487 A | * 10/1999 | Cook et al. | .................... 251/64 |

* cited by examiner

*Primary Examiner*—Henry C. Yuen
*Assistant Examiner*—John Bastianelli
(74) *Attorney, Agent, or Firm*—Margaret A. Dobrowitsky

(57) ABSTRACT

An evaporative control valve includes a plunger reciprocable between a valve stop and a valve seat to open and close a controlled port. The plunger has a body, a flexible support member mounted on one end of the body and a resilient tip positioned on the support member for sealing engagement with the valve seat. When the resilient tip of the plunger impacts the valve seat, the flexible support member absorbs substantially all of the force of impact by deflecting in the direction opposite the plunger movement, increasing impact time and reducing noise which may be generated. The resilient tip may be positioned on the flexible support member to further define a stop cushion to further reduce impact of the plunger against the valve stop.

8 Claims, 3 Drawing Sheets

US 6,517,044 B1

SOFT-LANDING PLUNGER FOR USE IN A CONTROL VALVE

TECHNICAL FIELD

The present invention relates to control valves and in particular, to an evaporative (EVAP) solenoid control valve including a plunger having noise reduction features.

BACKGROUND OF THE INVENTION

It is known in the art of automotive fuel systems to use an evaporative (EVAP) solenoid valve assembly to control the flow of fuel vapor through passageways connecting a purge canister and an intake manifold. One such EVAP control valve assembly includes a solenoid assembly actuated in response to a pulse width modulated (PWM) signal generated by the vehicle's central computer to induce a plunger to move toward a metal stop, opening a passageway to the flow of vapor. When the solenoid is de-energized, the plunger is pushed back toward a valve seat by a pre-loaded spring situated between the stop and the plunger, causing the plunger to seal the passageway.

The force of impact as a result of the plunger striking the valve stop or seat has been known to generate noise in some applications. Accordingly, EVAP control valve plungers have been designed to include a soft, rubber-like stop cushion at the interface with the valve stop and a rubber tip for sealing against the valve seat. At room temperature, noise due to impact with the stop or seat may be maintained at relatively low levels since the soft portions of the plunger exhibit relatively large deflection during impact, absorbing large amounts of the impact energy and extending the impact time to reduce the average impact force. However, where temperatures are close to or below the glass transition temperature of some kinds of rubber, those kinds of rubber tend to harden which may reduce the noise-dampening attributes.

SUMMARY OF THE INVENTION

The present invention provides an evaporative control valve including a plunger reciprocable between a valve stop and a valve seat to open and close a controlled port. The plunger has a body, a flexible support member mounted on one end of the body and a resilient tip positioned on the support member for sealing engagement with the valve seat. When the resilient tip of the plunger impacts the valve seat, the flexible support member absorbs substantially all of the force of impact by deflecting in the direction opposite the plunger movement, increasing impact time and reducing noise which may be generated. According to a further feature of this invention, the resilient tip may be positioned on the flexible support member to further define a stop cushion to further reduce impact of the plunger against the valve stop.

The above-described and other features and advantages of the present invention will be appreciated and understood by those skilled in the art from the following detailed description, drawings and appended claims.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
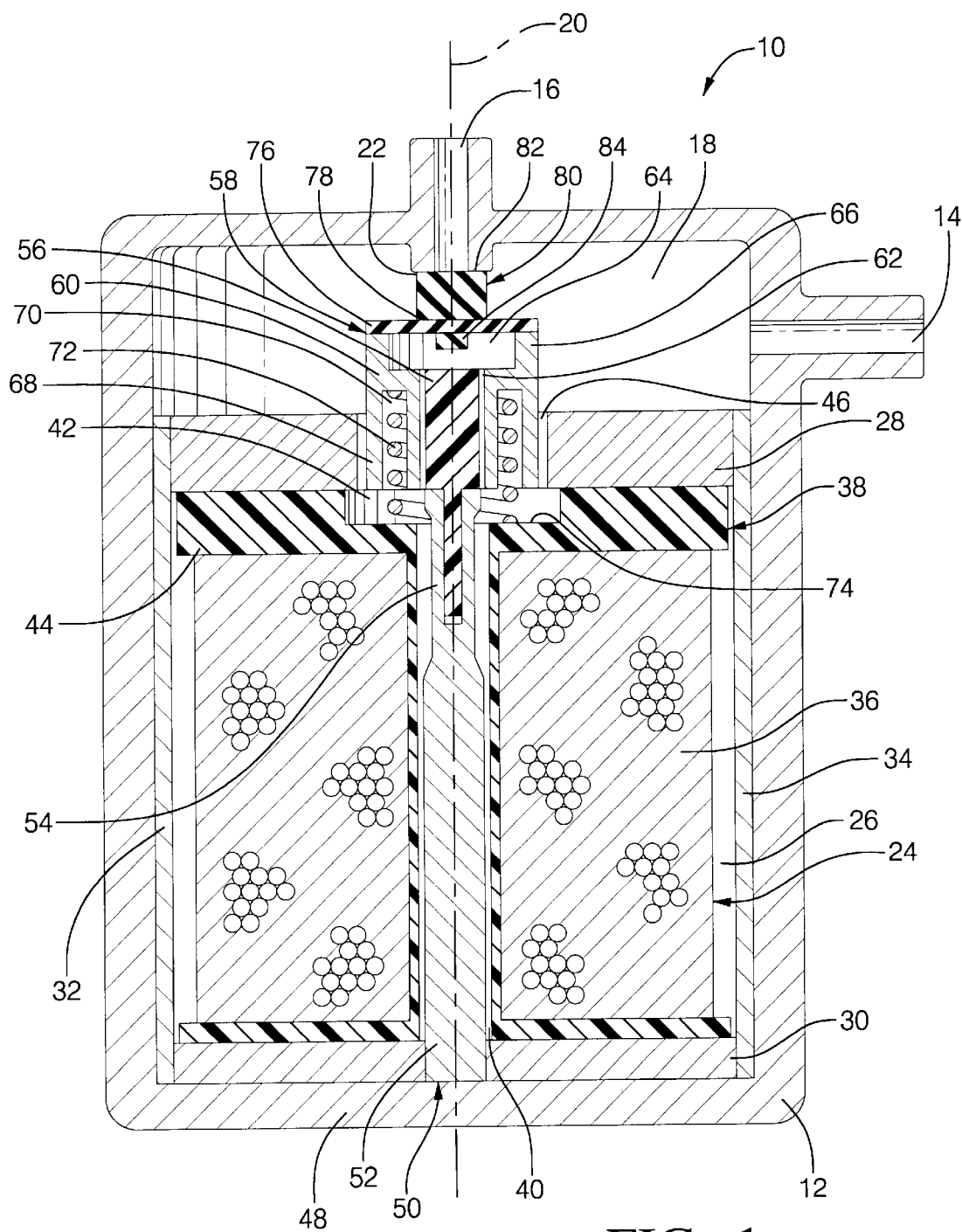
FIG. 1 is a cross-sectional view of an EVAP valve embodying all of the inventive aspects summarized above.

A solenoid-actuated valve assembly for use in a fuel system is shown in FIG. 1 and includes a valve body 12 that defines an inlet 14, a controlled port 16 and a chamber 18 therebetween wherein the inlet 14 is connectable to a filtration canister (not shown) and the port 16 is connectable to an intake manifold (not shown). The controlled port 16 is formed on an axis 20 and extends into the chamber 18 to define a seat 22 at the interface between the controlled port 16 and the chamber 18.

The valve body 12 also houses a solenoid assembly 24 within a cavity 26 formed adjacent the chamber 18, the cavity 26 being defined by a primary plate 28, a secondary plate 30, and sleeve portions 32, 34. The solenoid assembly 24 includes an electromagnetic coil 36 wound about a spool 38 supported between the primary and secondary plates 28, 30, respectively. The spool 38 has a central bore 40 positionable coaxial with axis 20 when the spool is assembled within the body 12. The bore 40 opens into an annular recess 42 formed in an end 44 of the spool 42 adjacent the primary plate 28. The annular recess 42 is further aligned coaxially with an opening 46 formed in the primary plate 28. Thus, the central bore 40, the recess 42 of the spool 38 and the primary plate opening 46 are all in axial alignment with the controlled port 16.

Affixed to an end 48 of the valve body 12 opposite the seat 22 along axis 20 is a stop 50. A conductive body 52 is received within the central bore 40 of the spool 38, to engage against stop 50. The conductive body 52 includes a tapered end portion 54 extending into the recess 42 of the spool end 44. A plastic insert 56 is secured to the tapered end of the conductive body 52 and extends through the opening 46 of the primary plate 28 into the chamber 18.

A plunger 58, movable between the seat 22 and stop 50 to open and close the controlled port 16, is situated within the opening 46 of the primary plate 44. The plunger 58 includes an annular body 60 defining a central bore 62 sized to receive the plastic insert 56 and tapered end 54 of the conductive body 52. The central bore 62 of the plunger body 60, like that of the spool 40, opens into a recess 64 formed in an end 66 of the plunger body 60 proximal the seat 22. An opposite end 68 of the plunger body 60 proximal the stop 50 includes an annular slot 70 extending radially for a predetermined width and axially for a predetermined depth. The annular slot 70 is adapted to receive a spring 72 with one end supported against a base 74 of the recess 42.

Spanning the end 66 of the plunger body 60 proximal the seat 22 is a flexible disk shaped spring or washer 76 having an aperture 78 coaxially aligned with axis 20. A resilient tip 80 is received within the aperture and has a surface 82 sealable in engagement with the valve seat 22 and a cushion 84 formed on an opposite side of the spring 72 proximal the valve stop 50.

Figure 2:
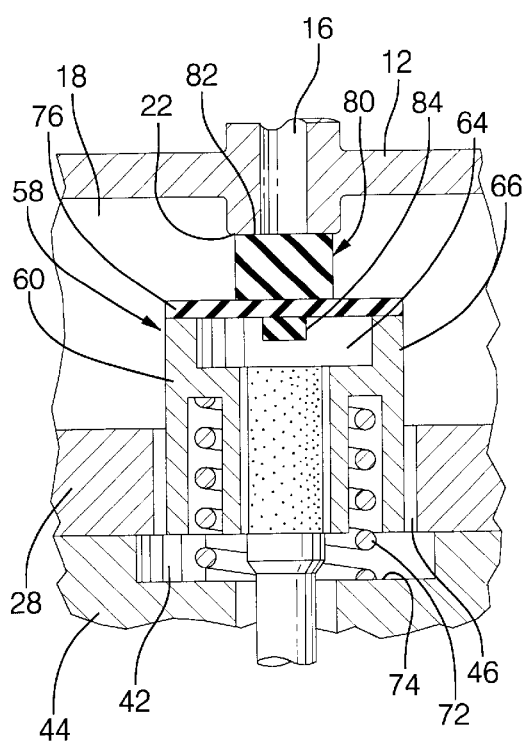
FIG. 2 is an enlarged cross-sectional view of a portion of the EVAP valve of FIG. 1 showing the plunger normally positioned to close a controlled port.
Figure 3:
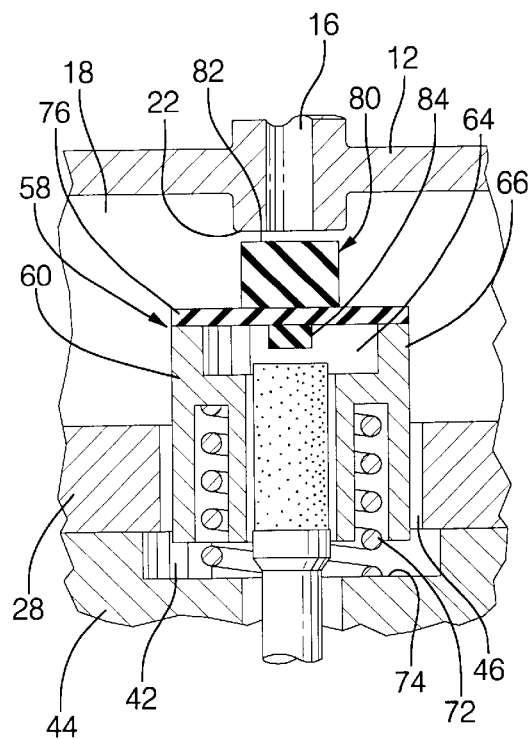
FIG. 3 is an enlarged cross-sectional view of a portion of the EVAP valve of FIG. 1 showing the plunger positioned toward a stop.
Figure 4:
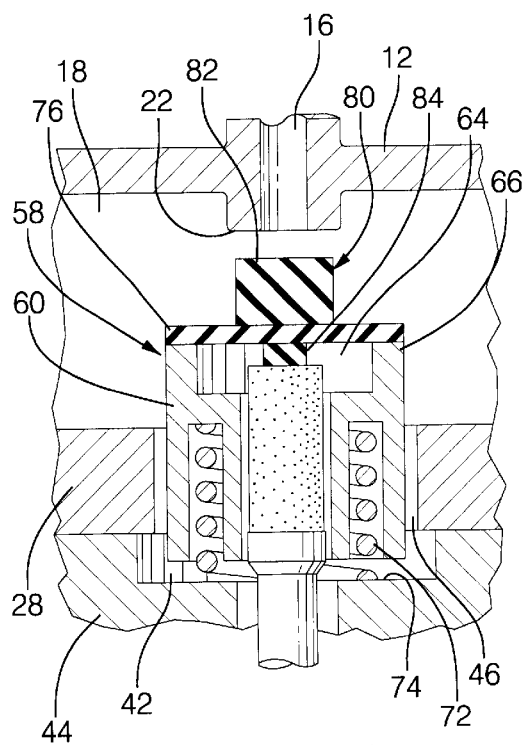
FIG. 4 is an enlarged cross-sectional view of a portion of the EVAP valve of FIG. 1 showing the plunger impacting the stop.
Figure 5:
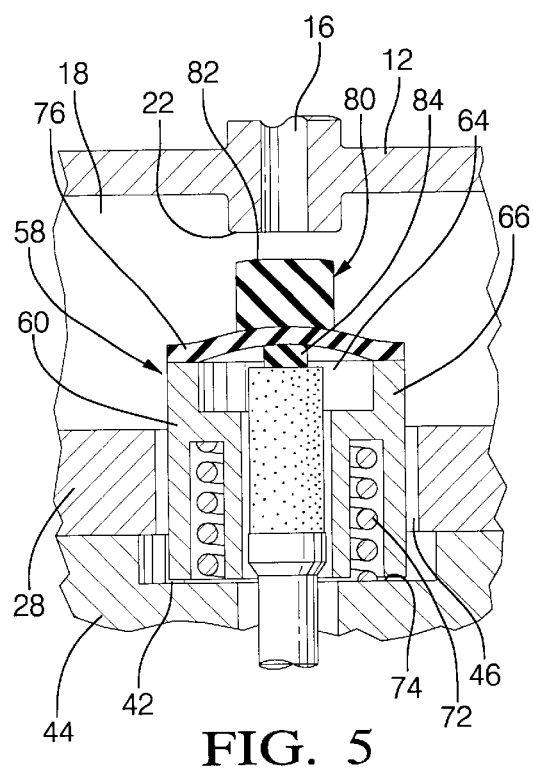
FIG. 5 is an enlarged cross-sectional view of a portion of the EVAP valve of FIG. 1 showing the flexible support member of the plunger deflecting in the direction opposite plunger movement.

As shown in FIGS. 2–9, the plunger 58 reciprocates between the seat 22 and the stop 50, operating to open and close the controlled port 16, so that vapor passing into the chamber 18 from the filtration canister through the inlet 14 is selectively released through the controlled port 16 into the intake manifold. Normally, the surface 82 of the resilient tip 80 of the plunger 58 is seated against the seat 22 to close the controlled port 16 as shown in FIG. 2. In other words, the solenoid control valve 10 is spring biased to a normally closed position as illustrated in FIG. 2. After receiving a pulse-width modulated signal generated by the central computer of the vehicle (not shown), the solenoid assembly 24 energizes, creating a magnetic field operable on the plunger 58, that causes the plunger 58 to gradually move toward the stop 50. Accordingly, FIG. 3 illustrates the plunger body 60 moving through the opening 46 of the primary plate 28 and the recess 42 of the spool 38 toward the conductive body 52 of the stop 50. As shown in FIG. 4, the stop cushion 84 of the plunger 58 eventually impacts the plastic insert 56 of the stop 50. The force created by the impact between the stop cushion 84 and the stop 50 is absorbed by the flexible spring 72, as shown in FIG. 5, which flexes in a direction opposite to the plunger body's 60 continuing movement toward the conductive body 52 of the stop 50. In this manner, noise due to impact between the plunger 58 and stop 50 is greatly reduced, while minimizing wear on the stop cushion 84.

Figure 6:
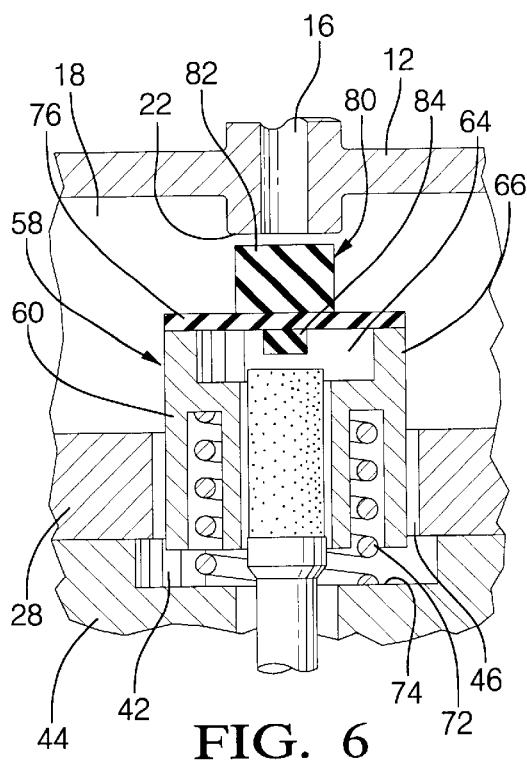
FIG. 6 is an enlarged cross-sectional view of a portion of the EVAP valve of FIG. 1 showing the plunger positioned toward a valve seat.
Figure 7:
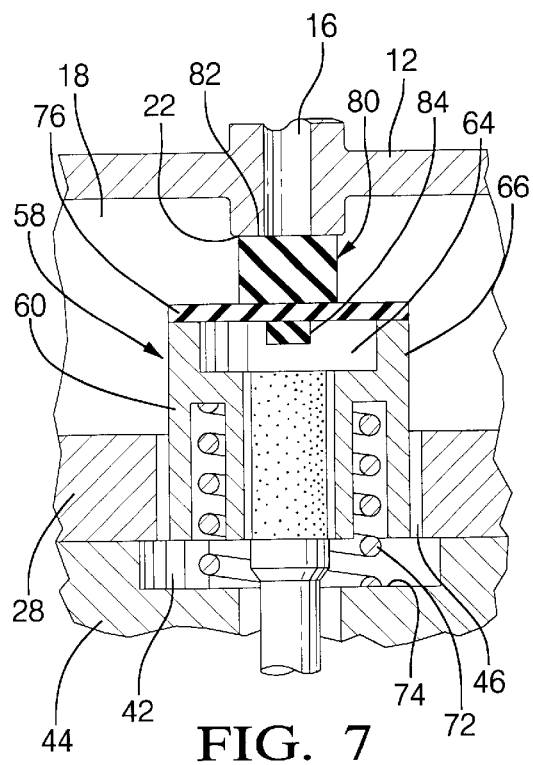
FIG. 7 is an enlarged cross-sectional view of a portion of the EVAP valve of FIG. 1 showing the plunger impacting the valve seat.
Figure 8:
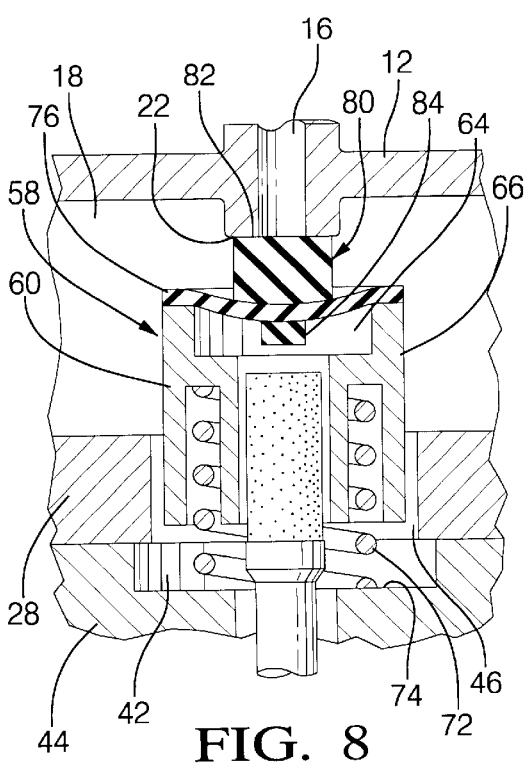
FIG. 8 is an enlarged cross-sectional view of a portion of the EVAP valve of FIG. 1 showing the flexible support member of the plunger deflecting in the direction opposite plunger movement.
Figure 9:
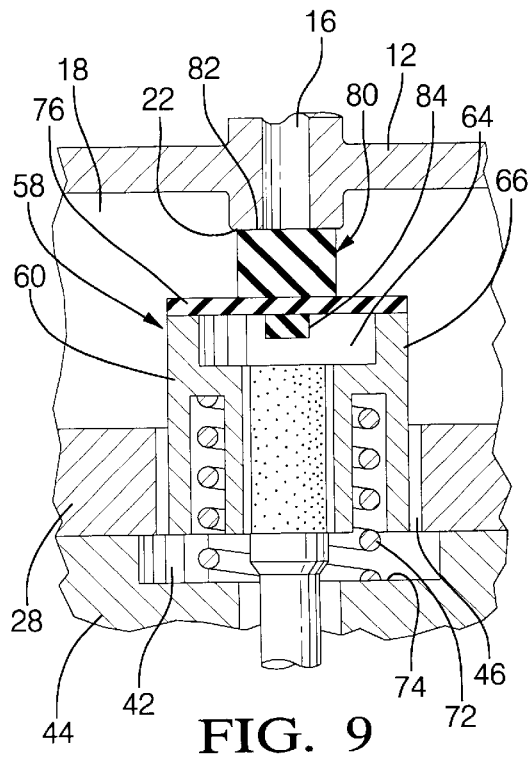
FIG. 9 is an enlarged cross-sectional view of a portion of the EVAP valve of FIG. 1 showing the plunger positioned against the valve seat to close a controlled port.

When the solenoid assembly 24 de-energizes, the pre-load forces of the spring 72 against the base 44 of the recess 42, urge the plunger 58 back toward the seat 22 to close the controlled port 16 (FIG. 6). When the surface 82 of the resilient tip 80 impacts the seat 22, as shown in FIGS. 7 and 8, the flexible spring 72 absorbs the resulting energy, and flexes in the direction opposite from the direction of movement of the plunger body 60, bringing the plunger body 60 to a controlled halt without creating undue noise in response to impact with the seat. Since the flexible spring 72 absorbs most of the energy created by the plunger 58 in response to impact with the stop 50 and the seat 22, the valve assembly 10 is quieter over a greater range of temperatures.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Accordingly, it is to be understood that the present invention has been described by way of illustration and not limitation.

What is claimed is:

1. A valve assembly comprising:

a valve body defining a chamber with a controlled port having a valve seat associated therewith;

a stop supported within the chamber of the valve body in axial alignment with the controlled port; and a plunger reciprocable between the stop and the seat to open and close the controlled port respectively, the plunger having a body, a resilient flexible washer mounted on an end of the body and a resilient tip secured to the washer for sealing engagement with the valve seat, wherein the flexible washer deflects in a direction opposite to the plunger movement for reducing a force of impact on the seat.

2. The valve assembly of claim 1 further comprising the resilient tip being secured to the washer to further define a stop cushion on an end facing the stop to reduce a force of impact on the stop.

3. The valve assembly of claim 1, wherein the washer is a disk shaped spring.

4. The valve assembly of claim 3, wherein the disk shaped spring includes a central aperture coaxially aligned with the controlled port, the resilient tip being received within the aperture.

5. The valve assembly of claim 1, further comprising a solenoid assembly operable to move the plunger toward the stop when the solenoid assembly is energized and toward the seat when the solenoid assembly is de-energized.

6. The valve assembly of claim 5, further comprising the plunger body being cylindrical with a cylindrical slot formed therein, and a pre-load spring disposed within the cylindrical slot for normally urging the plunger toward the stop when the solenoid assembly is de-energized.

7. A valve assembly comprising:

a valve body defining a chamber with a controlled port having a valve seat associated therewith;

a stop supported in the valve body coaxially aligned with the controlled port; and a solenoid assembly operable to move a plunger between opened and closed positions with respect to the controlled port, the plunger including a body, a flexible support member mounted on an end of the body and a resilient tip secured to the support member to define a first end adjacent the seat for sealing engagement with the seat, and a second end adjacent the stop for cushioning an impact of the plunger against the stop, wherein the flexible support member deflects in an opposite direction from a direction of movement of the plunger for reducing a force of impact on the seat and stop respectively.

8. The valve assembly of claim 7, wherein the flexible support member is a disk shaped spring interposed between the first and second ends of the resilient tip to define a sealing tip and stop cushion on the first and second ends respectively.

* * * * *